April 27, 1954
G. F. HORCH
2,676,411
TOPOGRAPHY MEASURING DEVICE
Filed Jan. 23, 1953
Fig.1
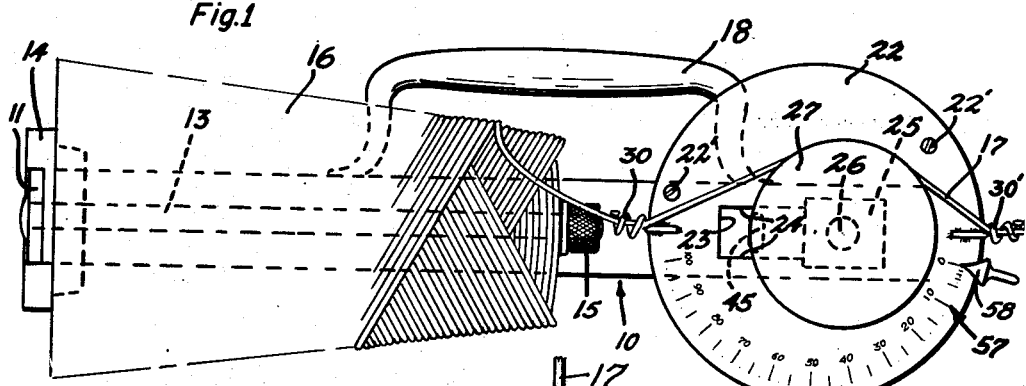
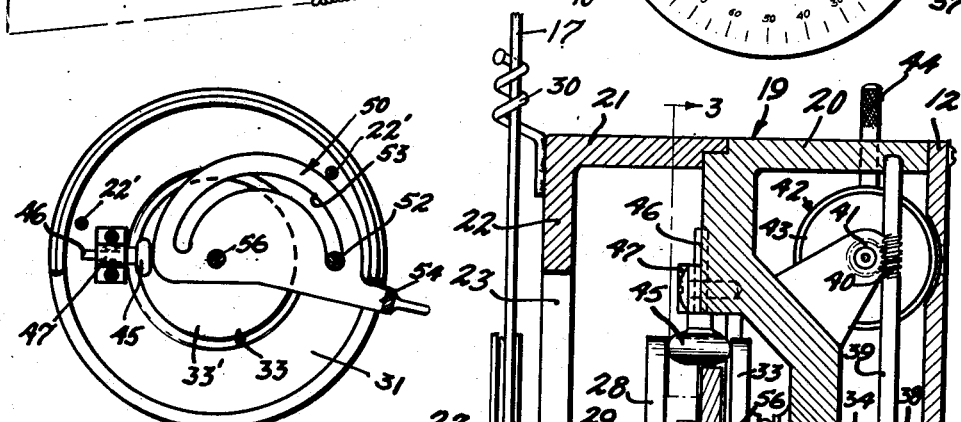
Fig.3
Fig.2
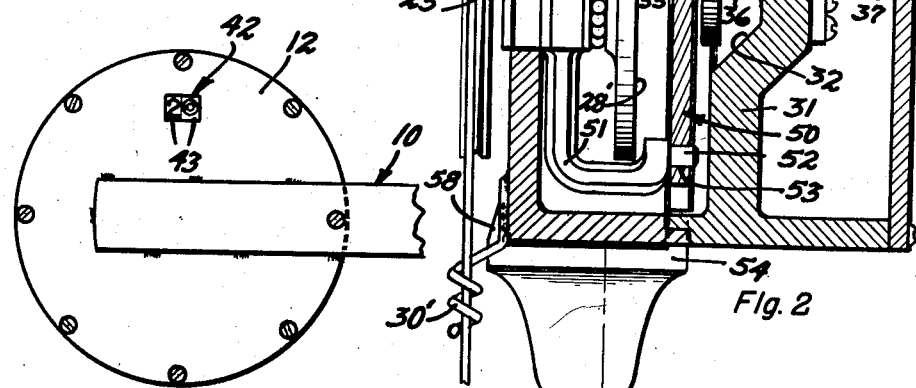
Fig. 4
INVENTOR,
George F. Horch
BY
*Glenn L. Fish*
Attorney Patented Apr. 27, 1954

2,676,411

UNITED STATES PATENT OFFICE 2,676,411

TOPOGRAPHY MEASURING DEVICE

George F. Horch, Spokane, Wash.

Application January 23, 1953, Serial No. 332,865

2 Claims. (Cl. 33—140)

This invention is a topography measuring device.

It is one object of the invention to provide a measuring device for use of surveyors, map makers and the like, which may be conveniently carried and used for measuring the relief of an area.

Another object of the invention lies in the provision of a topography measure which is energized by movement of the measure relative to the ground surface and which has an indicator driven by said movement at pre-determined ratios selectively variable by the operator.

Another object of the invention lies in the provision of a topography measure which is driven by a line laid along the ground and which has an indicator for showing the horizontal measurement traversed by the measuring device regardless of the percentage of grade over which the device is moved.

Another object of the invention lies in the provision of a topography measure which will greatly assist in locating properties, making maps and like work by eliminating the need of mental calculations to determine horizontal distances when traversing grades.

Another object of the invention lies in the provision of a motion transmitting mechanism which unites a driven spool and an indicator and includes means for selectively varying the ratio of movement between the input and output of the transmission.

These and other objects of the invention will become apparent during the course of the following description.

In the accompanying drawings, forming a part of this specification, and in which like numerals are employed to designate like parts, Figure 1 is a side elevation of the preferred form of topography measure;

Figure 3 is a horizontal cross section taken through the measuring device;

Figure 3 is a vertical cross section as at line 3—3 of Figure 2; and

Figure 4 is a fragmentary side elevation taken from the side opposed to that shown in Figure 1.

Even though at one setting my present invention may be used as a means of measuring line, it is not primarily a line measuring device. In locating properties, surveying for maps and other work of this type, it is necessary to project the relief of an area onto a plane, thereby requiring that all measurements be made on the horizontal. In surveying it is common to use measurements of links, rods and chains and, therefore, we will be primarily concerned with these units of measurement. However, obviously the invention is not restricted to any unit of measurement and the English metric system or the American system using feet and inches, or even other measurement units, may be equally as effective with this invention.

By way of illustration, one chain equals 66 feet. During a survey it is found that a river is exactly 66 feet from a spring on the horizontal dimension; however, the spring is up the side of a hill which has a 50 per cent slope and if measurement is taken from the edge of the river up the slope to the spring, it will be found that the spring is approximately 73 feet 8½ inches from the river. If this were to be projected on a plane, as a map is, it would give a false description of the relative location of the two parts. Presently it is necessary to measure the distance from the river up the slope to the spring, measure the percentage of grade and by triangulation calculate the actual horizontal distance of the spring from the river. My invention seeks to eliminate the necessity of these calculations and thus reduce the possibilities of error.

With the invention presently to be described it is only necessary to set the indicator to a 50 per cent slope, secure the line at the river's edge and transport the measuring device up the grade to the spring, and when the spring is reached the indicator will show one chain, or 66 feet, while the spool has actually discharged 73 feet 8½ inches of line.

In Figure 1, I have shown the topography measure as having a frame 10 which consists of a length of strip iron which has a right angle bend at one end forming a tongue 11 and at the opposed end is welded, or otherwise secured, to a cover plate 12 of the measuring device. The tongue is drilled to support a bolt 13 extending in spaced parallel relation to the frame strip 10 and secures a spool base 14 to the tongue and has a knurled securing nut 15 for releasably connecting a spool 16 of line 17 to the frame 10.

A carrying handle 18 is welded or otherwise secured to the frame and affords easy manipulation of the measuring device.

The measuring device proper comprises a housing 19 having separable sections 20 and 21 which are releasably secured together by means of bolts 22'. The housing is preferably circular in shape and the section 21 is provided with an end plate 22 formed integrally with the section. The end plate 22 is provided with a diametrically disposed aperture 23 which defines upper and lower ways 24 for a slidable bearing block 25 carried therein.

The bearing block is provided with a central bore and an input shaft 26 extends through the bearing block and is suitably journaled therein and carries on its outer end a spool 27 rigidly fixed to the shaft 26. On its inner end, shaft 26 is provided with a disc 28 and a thrust bearing 29 is disposed between the disc 28 and the bearing block 25. It will, therefore, be seen that as the bearing block 25 is shifted on the ways 24 longitudinally of the aperture 23, spool 27, shaft 26, disc 28 and bearing 29 will be moved therewith. The line 17 being discharged from line spool 16 passes through one line guide 30, makes one complete revolution about the spool 27 and passes on through line guide 30'. Thus as the line is drawn from the line spool 16, spool 27 is rotated, which in turn rotates disc 28 through input shaft 26.

The other section of housing 20 is provided with a supporting wall 31 which has a central depression 32 for containing a second disc 33 carried by an output shaft 34 journaled at 35 in the supporting wall 31. Disc 33 is provided with a thrust bearing 36 interposed the disc and the supporting wall 31, and the output shaft 34 has on its opposed end a spiral 37 which cooperates with a gear 38 carried by a shaft 39 extending at right angles to the output shaft 34 and having a spiral or worm 40 cooperating with a gear 41 adapted to drive the indicator 42.

As shown in the drawing, the indicator 42 comprises independent rotatable reels 43 which have numerals or other indicia on their peripheral faces. The construction and operation of this indicator is similar to that of an ordinary automobile speedometer and the indicator also has a reset button as at 44 for returning the indicator to zero. When used for surveying or map making, and using the measurement units of chains and links, the reel on the left in Figure 4 may indicate the chains and the reel on the right in Figure 4 may indicate links. In other words, the reel on the right would be numbered to 100 and one complete revolution of the reel on the right would show 100 links and one chain, the reel on the right normally returning to zero. Obviously, any number of reels necessary for the work at hand could be provided in the measuring device. These numerals or indicia may be varied according to the measuring units used by the operators.

The invention thus far described shows means of rotating disc 28 and also means of operating indicator 42 by disc 33. Since it is required that the amount of line discharged from spool 16 be increased as the grade percentage increases, it is necessary that the motion transmitting mechanism described include a means for selectively varying the ratio of movement between the input shaft 26 and output shaft 34. To do this I have provided a friction wheel 45 disposed at right angles to the spaced discs 28 and 33, which themselves are relatively spaced in parallel planes, and the wheel bears against the faces 28' and 33' of their respective discs. The wheel 45 bears against the face 33' of disc 33 adjacent its marginal edge and when the bearing block 25 is positioned as shown in Figure 2, it bears against the face 28' adjacent the marginal edge of disc 28. The location of wheel 45 is constant and is carried by a journal 46 secured as by a cap 47 threadedly binding the journal 46 to the wall 31. Therefore, as disc 28 rotates, it will cause wheel 45 to rotate and wheel 45 will in turn cause disc 33 to rotate. The ratios between disc 28 and disc 33, elements 37 and 38, and elements 40 and 41 will be such when the discs are positioned as shown in Figure 2 that discharge of 66 feet of line about spool 27 will cause the indicator 42 to show one chain.

To vary this ratio and permit more line to be discharged while the indicator shows but one chain, the bearing block 25 is shifted on its ways 24 carrying disc 28 by wheel 45 and thus causing wheel 45 to engage face 28' at a point closer to its center, thereby decreasing the number of revolutions imparted to wheel 45 for each revolution of disc 28. The closer wheel 45 comes to the center of disc 28, the lower the ratio between the disc 28 and wheel 45.

Since the movements of block 25 are so minute they are nearly impossible to see with the naked eye, and since the speed of movement must vary among changes in grade, I have found it most practical to move the bracket by means of a cam 50. An arm 51 is carried by the bearing block 25 and extends about the periphery of disc 28 and is provided with a pin 52. This pin is slidable in the cam slot 53 of cam 50 and as the cam 50 is rotated by lever 54, the pin 52 is shifted toward the axial center of housing 19, thus shifting bearing block 25 and disc 28. The cam is pivotally supported at the axial center of housing 19 by means of a diametrically extending supporting bar 55 and a stub bolt 56 threadedly engaged therein.

On a portion of the marginal edge face of the end plate 22, I have provided indicator markings as at 57 and the lever 54 is provided with a pointer 58 which cooperates with the markings to indicate the movement of the bearing block 25 by cam 53. The indications 57 are shown from zero to one hundred percent of grade in numerals and this may be reduced as indicated between zero and the five-per-cent mark to one per cent grade markings. Therefore, when the percentage of grade is calculated, the device is set with the pointer 58 indicating that percentage and the topography measure is transported up the grade to the point where the grade changes or to the end of the distance to be measured, and the reading is taken from the indicator showing the chains and links on a horizontal plane to the specific point. If the measurement is to continue and the grade changes, the lever 54 may be reset to the new grade and the measurement continued to the end of the measurement in any straight line, at which time reset button 44 may be used to return the indicator to zero and then the measurement may be made in another direction. It is obvious that the line 17 may be secured to the ground surface at any point desired to eliminate discrepancies by sagging, stretching or other undesirable effects.

Having thus described my invention, I claim:

1. A topography measure comprising a housing, an indicator carried by the housing, a disc rotatably carried by the housing and adapted to operate said indicator, a wheel journaled on said housing and disposed at right angle to the plane of said disc and frictionally engaging the face thereof at a point remote from its center; a second disc disposed in a plane substantially parallel with and spaced from the first named disc and having its face frictionally engaging said wheel; a bearing block carried by the housing and shiftable diametrically of said first named disc; a manually operated cam for shifting said bearing block, said second named disc being rotatably supported by said bearing block; and a line driven spool operably connected to said second named disc, whereby rotation of the spool effects rotation of its companion disc.

2. A topography measure comprising a line driven spool, an indicator, and motion transmitting mechanism having an input and an output operably connected to said spool and indicator respectively; said transmission including rotatable discs disposed in substantially spaced parallel planes, one connected to said input and one to said output; a journaled wheel disposed in a plane at right angles to said disc planes and frictionally engaging the faces of said discs at points remote from their centers; and means for selectively shifting one said disc in its plane diametrically of the other disc.

References Cited in the file of this patent

UNITED STATES PATENTS

| Number | Name | Date |
| --- | --- | --- |
| 130,120 | Finley | Aug. 6, 1872 |

FOREIGN PATENTS

| Number | Country | Date |
| --- | --- | --- |
| 449,028 | France | Dec. 12, 1912 |